Aug. 2, 1960 A. BLOOM 2,947,314
INLINE DILUTER VALVE
Filed July 13, 1959

AARON BLOOM
INVENTOR.

BY Beehler & Shanahan

ATTORNEYS.

United States Patent Office 2,947,314
Patented Aug. 2, 1960

2,947,314

INLINE DILUTER VALVE

Aaron Bloom, Pasadena, Calif., assignor to Sierra Engineering Co., Sierra Madre, Calif., a corporation of California Filed July 13, 1959, Ser. No. 826,813

5 Claims. (Cl. 137—64)

The invention relates to valves which are used particularly in breathing apparatus. More especially the invention has reference to a diluter valve by means of which oxygen in pure form supplied from a suitable source is diluted with air which surrounds the apparatus generally, commonly termed ambient air, in appropriate proportions so that the breathing system to which the valve is fixed will be fed a proportionate amount of pure oxygen and air, depending upon the need of the subjects making use of the apparatus.

Under certain conditions as, for example, those experienced in high altitude flying, there is invariably need to supply the subject, be he pilot or other airman, with a sufficient amount of oxygen for his bodily needs under those special circumstances. Due to the fact, however, that the altitude changes appreciably between take-off and ceiling height, there is a considerable variation in the need for pure oxygen on the part of the subject using the breathing system. For example, at take-off and low altitudes there is an ample amount of oxygen present in the ambient air so that little or no pure oxygen need be taken from the oxygen supply. As the altitude increases, more oxygen is needed and hence it is desirable to make use of a lesser amount of the ambient air which at the same time carries a lesser amount of oxygen to the system.

Certain devices have been employed heretofore in equipment directed to the mixing of oxygen with ambient air. These systems, however, have been constructed so that the supplies of oxygen and ambient air are in parallel relationship controlled in some instances by differential pressures created by sundry means such, for example, as a Venturi orifice. The performance of such prior art devices has not been dependable and has been insufficiently strong to meet all circumstances and especially a variety of conditions which change rapidly as well as extreme conditions at ceiling heights.

It is therefore among the objects of the invention to provide a new and improved mixing or diluting valve which is capable of automatically proportioning quantities of ambient air and pure oxygen under various conditions.

Another object of the invention is to provide a new and improved mixer or diluter valve which is automatic in its operation and particularly effective at all altitude variations and moreover quickly responsive to rapid changes.

Still another object of the invention is to provide a new and improved diluter valve automatically operative to achieve virtually any setting between a supply of pure oxygen to the exclusion of all ambient air and very heavy dilutions of ambient air with pure oxygen almost to the exclusion of pure oxygen.

Still another object of the invention is to provide a new and improved diluter valve which is compact in its arrangement and wherein sundry moving parts and particularly valve elements are combined in a fashion such that the entire apparatus can be encompassed in a particularly small package.

Another object still is to provide a new and improved diluter valve wherein the control of the mixture of ambient air with oxygen is carried on effectively over wide ranges without in any way adversely affecting the normal exhaust cycle.

Also included among the objects of the invention is to provide a new and improved diluter valve which is positive in its action, easy to calibrate, and easy to service in that the movable valve elements can be removed and replaced in the device without the necessity of disturbing the position or setting of the automatic members.

With these and other objects in view, the invention consists in the construction, arrangement and combination of the various parts of the device, whereby the objects contemplated are attained, as hereinafter set forth, pointed out in the appended claims and illustrated in the accompanying drawings.

Figure 1:
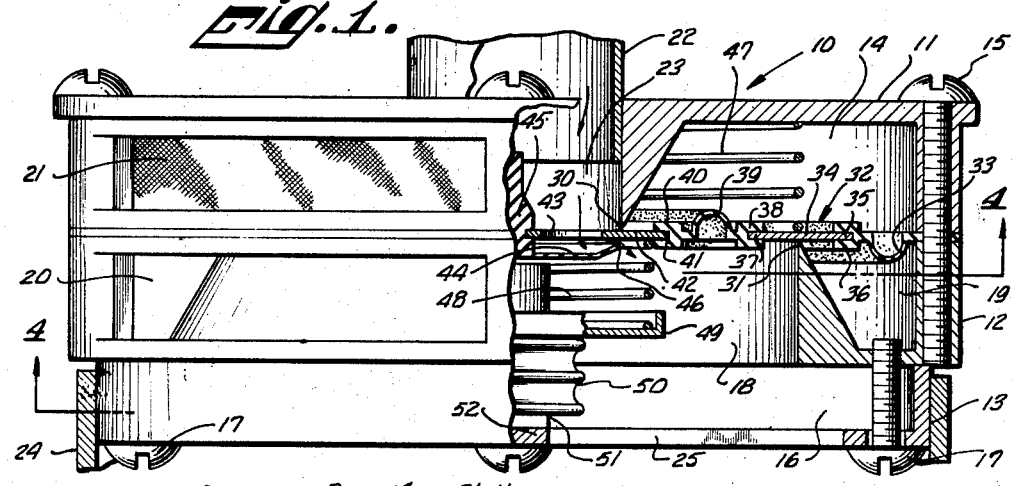
Figure 1 is a side elevational view partially in section taken on the line 1—1 of Figure 4 showing the adjustment of the valve as it would be when subject to high altitude and at the inflow phase of the breathing cycle.

In an embodiment of the invention chosen for the purpose of illustration there is shown a valve body indicated generally by the reference character 10 which consists in particular of three sections, namely, an upstream section 11, an intermediate section 12, and a downstream section 13. The upstream section provides a chamber 14 which is annular in form, the upstream section being secured to the intermediate section by means of screws 15. The downstream section 13 provides a chamber 16 and the downstream section is fastened to the intermediate section by means of screws 17. The intermediate section provides a chamber 18 intercommunicating with the chamber 16. The same intermediate section also provides an annular exhaust chamber 19 which surrounds the chamber 18. Exhaust ports 20 communicate between the exhaust chamber 19 and the exterior or with the ambient air. Ambient air inlet ports 21 communicate between the ambient air and the chamber 14.

In the interest of better understanding the description here following there is suggested an oxygen supply line 22 which communicates with an oxygen supply passage 23. A breather line 24 is shown attached to the downstream section 13 in a position to accept a mixture of air and oxygen passing from the intercommunicating chambers 18 and 16 through a breather port 25.

Attention is directed particularly to an annular inner valve seat 30 which is at a location separating the supply passage 23 from the chamber 14 and hence from the ambient air inlet ports 21. A second annular outer valve seat 31 is positioned within the intermediate section and separates the chamber 18 from the exhaust chamber 19.

Operably mounted upon both of said valve seats 30 and 31 is a composite valve member indicated generally by the reference character 32. This valve member has an outer annular flexible section 33 which is sealed between the upstream body section 11 and the intermediate body section 12 by the drawing together of these sections through the agency of screws 15.

An outer annular valve element 34 has its outer perimeter 35 secured in sealed relationship with an inner perimeter 36 of the flexible section 33. At its inner perimeter 37 the valve element has a sealed connection with an outer perimeter 38 of an inner annular flexible section 39. Again the inner flexible section 39 is joined in sealing relationship at its inner perimeter 40 to an outer perimeter 41 of an inner annular valve element 42.

Figures 2, 3:
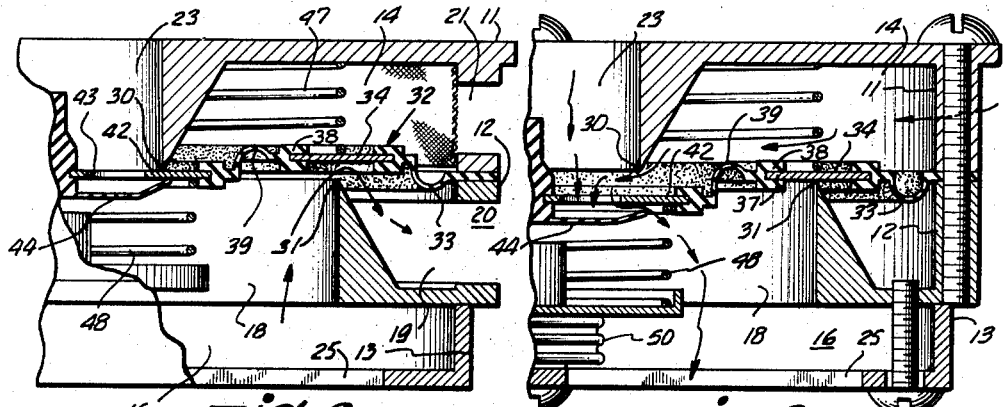
Figure 2 is a fragmentary sectional view similar to Figure 1 showing the valve in the adjustment which would be experienced at relatively low altitudes during the inflow phase of the breathing cycle.
Figure 3 is a fragmentary sectional view taken on the line 3—3 of Figure 4 showing the position of the valve parts during the exhalation phase of the breathing cycle.
Figure 4:
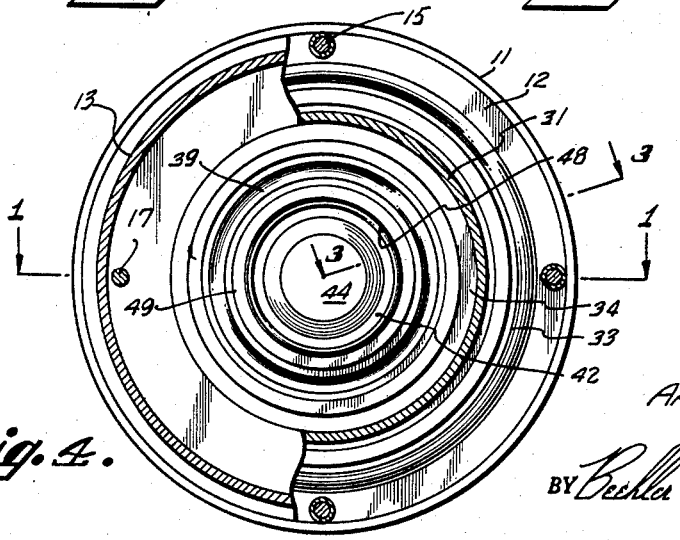
Figure 4 is a cross-sectional view taken on the line 4—4 of Figure 1.

As clearly shown in Figures 1, 2 and 3, the valve element 34 seats upon the outer valve seat 31 and the valve element 42 seats upon the valve seat 30. The seating action, however, takes place in opposite directions as shown.

In the valve element 42 are passages 43 and these are closed by an outflow check valve 44 which is mounted at its mid-portion by employment of a valve stem 45 to the mid-portion of the valve element 42. The check valve has a rim 46 which seats upon the underside of the valve element 42, as shown in Figures 1, 2 3, thereby to be capable of closing the passages 43 when the cycle is in one direction and opening those passages when the cycle is in the opposite direction. It should be borne in mind that the entire valve member 32 which includes both annular valve elements, the outflow check valve, and the flexible sections, is capable of moving up and down, as viewed in the figures of the drawing. A spring 47 acts normally against the upper side of the valve element 34 to urge it upon the seat 31 but due to the flexible character of the sections 33 and 39, the action of the spring 47 is not transferred to any other portion of the composite valve member 32.

A second spring 48 serves as a means of pressing upwardly as shown against the underside of the valve element 42, thereby to urge it upon its seat 30 without affecting any other portion of the composite valve member due to the interposition of the flexible section 39.

The spring 48, however, is contained within a cup 49 serving as a spring keeper and the cup is secured to the upper end of aneroid 50 which is an expandable and contractible bellows device subject to expansion and contraction, depending upon the barometric pressure of the ambient air. The aneroid is secured at its lower end 51 by some appropriate means to a mid-section 52 of the downstream section 13.

When the valve device is at lower altitude levels, the aneroid 50 will assume a contracted position similar to that illustrated in Figure 2. In this position the cup 49 is drawn downwardly and tension in the spring 48 is minimized. Hence, there is relatively light pressure against the valve element 42 and during the inhalation cycle pressure present in the ambient air coupled with pressure present in the supply passage 23 will cause the valve element 42 to unseat from the valve seat 30 when pressure is reduced on the opposite side within the chambers 18 and 16 as the subject inhales. At the same time, the outflow check valve 44 will be flexed to unseated position and the mixture of oxygen and ambient air will flow together through the passages 43 and thence into the chambers 18 and 16 and through the breather port 25 to the breathing system.

When the exhaling phase of the cycle takes place, pressure within the chambers 16 and 18 being greater than pressures in the supply passage 23 and chamber 14, the outflow check valve 44 will be flexed to position against the valve element 42 closing the passages 43 and at the same time the valve element 34 will be unseated from the valve seat 31, thereby to permit exhaust gases to pass into the exhaust chamber 19 and thence outwardly through exhaust ports 20.

It will be noted that during this phase of operation the valve element 42 is seated upon the valve seat 30 and that the flexible sections 33 and 39 permit the valve element 34 to move freely with respect to other portions of the composite valve member 32 controlled only by the compression present in what may be designated as the relatively light spring 47. This operation above described, shown in Figure 3, is reversed upon the inhalation phase of the breathing cycle, as illustrated and already described in connection with Figure 2, in which position the spring 47 urges the valve element 34 to seated position.

When the device is subjected to higher altitude conditions where the barometric pressure present in the ambient air is lower, the aneroid 50 will expand and assume a position approximating that illustrated in Figure 1. Expansion of the aneroid raises the cup 49, moving it against the spring 48, and urging the spring with greater pressure against the valve element 42. Hence the valve element will be pressed under greater pressure against the valve seat 30 and this will occur independently of action of the spring 47 against the valve element 34 and accordingly will not affect the exhalation phase of the breathing cycle when it takes place at this higher altitude. Because of the fact that the valve element 42 is urged with greater force against its valve seat 30, there will be less opportunity for ambient air to pass the valve seat 30 into the supply passage 23. Hence, the proportion of pure oxygen conducted through the supply passage will be greater and the proportion of the ambient air admitted thereto will be less. Just what the proportioning will be can be adjusted by a proper calibration of the aneroid 50 so that when it acts against the spring 48, it will vary the spring effect and accordingly vary the amount of opening of the valve element 42 admitting more or less ambient air, depending upon the pressure present in the ambient air. At extremely high altitudes approaching ceiling, the aneroid may expand to such an extent that virtually all ambient air will be shut off and only pure oxygen will be passed to the breather port 25. This addition, however, can prevail without in any way impairing the exhalation phase of the cycle and also without impairing the normal functioning of the outflow check valve 42 which operates independently of the position or condition of the remaining portions of the composite valve member 32.

From the foregoing description it will be clear that the mixing of ambient air and pure oxygen takes place before passage into the downstream chambers and hence there is a very advantageous condition present resulting in a complete mixing, regardless of the altitude condition, long before the mixture is passed to the breathing system.

It will further be noted that the mounting of the aneroid in the downstream section can be permanent once calibrated even though the upstream section 11 might be disengaged from the intermediate section 12 for the purpose of servicing the valve elements or flexible sections which might need replacement or inspection. Moreover, by making use of a composite valve member as shown, interposed between oppositely positioned concentric valve seats, the entire device can be compactly and positively housed in a relatively small housing which is advantageous not only from the point of view of valve operation, but also from the point of view of general mechanical effectiveness. The simple in-line operation of the various parts promotes the positive dependable action necessary in critical components such as the breathing valve hereinabove described.

While the invention has herein been shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices.

Having described my invention, what I claim as new and desire to secure by Letters Patent is:

1. A diluter valve device for mixing and admitting oxygen and ambient air to a breathing system comprising a valve body having an ambient air port and a breather chamber, means forming an oxygen supply passage to said breather chamber, an exhaust port from said breather chamber, a first valve seat separating said oxygen supply passage from said ambient air port and a second valve seat separating said exhaust port from said breather chamber, a flexible composite valve member mounted in the valve body having a first valve element seating in one direction upon said first valve seat and a second valve element seating in an opposite direction against said second valve seat, a passage through said composite valve and an outflow check valve therefor, a pressure sensitive element in said body subject to ambient air pressure and connecting means between said pressure sensitive element and said first valve element, said pressure sensitive element when subjected to higher ambient air pressure having movement effective of a restriction of the opening of said first valve element without affecting said second valve element and when subjected to lower ambient air pressure effective of an increase of the opening effect of said first valve element whereby to control the mixture of ambient air and oxygen passing to the breather chamber in response to changes in ambient air pressure.

2. A diluter valve device for mixing and admitting oxygen and ambient air to a breathing system comprising a valve body having an ambient air chamber and a breather chamber, means forming an oxygen supply passage to said breather chamber, an ambient air port to said ambient air chamber, an exhaust port from said breather chamber and a breather port from said breather chamber, a first annular valve seat separating said oxygen supply passage from said ambient air chamber and a second annular valve seat separating said exhaust port from said breather chamber, a flexible composite valve member mounted in the valve body having a first annular valve element seating in one direction upon said first annular valve seat and a second annular valve element seating in an opposite direction against said second annular valve seat, a passage through said composite valve and an outflow check valve therefor, a pressure sensitive element in said body subject to ambient air pressure and connecting means between said pressure sensitive element and said first valve element, said pressure sensitive element when subjected to higher ambient air pressure having movement effective of a restriction of the opening of said first valve element without affecting said second valve element and when subjected to lower ambient air pressure effective of an increase in the opening effect of said first valve element whereby to control the mixture of ambient air and oxygen passing to the breather chamber in response to changes in ambient air pressure.

3. A diluter valve device for mixing and admitting oxygen and ambient air to a breathing system comprising a valve body having an ambient air chamber and a breather chamber, means forming an oxygen supply passage within said ambient air chamber to said breather chamber, an ambient air port to said ambient air chamber, an exhaust port from said breather chamber and a breather port from said breather chamber, a first annular valve seat separating said oxygen supply passage from said ambient air chamber and a second annular valve seat separating said exhaust port from said breather chamber, a flexible composite valve member mounted in the valve body having a first valve element seating in one direction upon said first annular valve seat and a second valve element seating in an opposite direction against said second annular valve seat, a passage through said composite valve and an outflow check valve therein, an aneroid element in said body subject to ambient air pressure and a spring between said aneroid and said first valve element, said aneroid when subjected to higher ambient air pressure having a progressively expanding condition effective of an increase in spring tension and restriction of the opening of said first valve element without affecting said second valve element and effective of a decrease in spring tension when subjected to lower ambient air pressure to increase the opening effect of said first valve element whereby to control the mixture of ambient air and oxygen passing to the breather chamber in response to changes in ambient air pressure.

4. A diluter valve device for mixing and admitting oxygen and ambient air to a breathing system comprising a valve body having a downstream section and an upstream section, a chamber in said downstream section, means forming a chamber in said upstream section, and an oxygen supply passage in said upstream section, an ambient air supply port to the chamber in said upstream section, an exhaust port from the chamber in said downstream section and a breather port from said downstream section, a composite valve member between said upstream section and said downstream section comprising an annular inner valve element, an annular outer valve element, an annular flexible connection between said valve elements and an annular flexible connection between said outer valve element and said body, an annular valve seat on one side of said valve member for said inner valve element separating said supply passage from said ambient air supply port, an annular exhaust valve seat in the downstream section on the opposite side of said valve member operably engageable with said outer valve seat and separating said exhaust port from the chamber in said downstream section, a passage through said valve member having an outflow check valve therein, and pressure sensitive means in said body responsive to ambient air pressure in operable engagement with said valve member movable when subjected to lower pressure in a direction restricting opening of said inner valve element and when subjected to higher pressure in a direction amplifying opening of said inner valve element whereby to vary the mixture of oxygen with ambient air.

5. A diluter valve device for mixing and admitting oxygen and ambient air to a breathing system comprising a valve body having a downstream section, an intermediate section and an upstream section, means forming interconnected chambers respectively in said downstream and intermediate sections, and means forming a chamber in said upstream section, an oxygen supply passage in said upstream section, an ambient air supply port to the chamber in said upstream section, an exhaust port from the chamber in said intermediate section and a breather port from said downstream section, a composite valve member between said upstream section and said intermediate section comprising an annular inner valve element, an annular outer valve element, an annular flexible connection between said valve elements and an annular flexible connection between said outer valve element and said body, an annular valve seat on one side of said valve member for said inner valve element separating said supply passage from said ambient air supply port, an annular exhaust valve seat in the intermediate section on the opposite side of said valve member operably engageable with said outer valve seat and separating said exhaust port from the interconnected chambers, a passage through said valve member having an outflow check valve therein, and pressure sensitive means in said body responsive to ambient air pressure in operable engagement with said inner valve element movable when subjected to lower pressure in a direction restricting opening of said inner valve element and when subjected to higher pressure in a direction amplifying opening of said inner valve element whereby to vary the mixture of oxygen with ambient air.

No references cited.